United States Patent

Alterman et al.

[11] 3,944,497
[45] Mar. 16, 1976

[54] DETERGENT COMPOSITION CONTAINING COATED BLEACH PARTICLES

[75] Inventors: David S. Alterman, Parsippany; Kil Whan Chun, Ridgefield Park, both of N.J.

[73] Assignee: Lever Brothers Company, New York, N.Y.

[22] Filed: Apr. 14, 1975

[21] Appl. No.: 567,675

Related U.S. Application Data

[62] Division of Ser. No. 422,813, Dec. 7, 1973, Pat. No. 3,908,045.

[52] U.S. Cl. .................. 252/96; 252/97; 252/187 C
[51] Int. Cl.² ..................... C11D 3/395; C11D 9/30
[58] Field of Search ..................... 252/96, 97, 187 C

[56] References Cited
UNITED STATES PATENTS

| | | | |
|---|---|---|---|
| 3,154,494 | 10/1964 | Speak et al. | 252/96 |
| 3,459,665 | 8/1969 | Schiefer et al. | 252/96 X |

*Primary Examiner*—Harris A. Pitlick
*Attorney, Agent, or Firm*—Kenneth F. Dusyn; James J. Farrell; Arnold Grant

[57] ABSTRACT

Particles of a fluidizable substance are coated with a complete and continuous coating by a process wherein a non-aqueous solution of a coating substance is sprayed from a nozzle downwardly on a fluidized bed of the particles to be coated, the nozzle height being adjusted so that the liquid droplets of coating material would just cover the cross-sectional area of the upper surface of the bed, if sprayed on the unexpanded bed. When the aforementioned coating is a fatty acid having 12–20 carbon atoms applied to particles of a chlorine-releasing agent, and when a second coating is applied by treatment with a solution of a fixed alkali hydroxide, i.e., sodium, potassium, or calcium hydroxide, an effective, completely encapsulated, non-pinholing bleach product is obtained.

1 Claim, 3 Drawing Figures

DETERGENT COMPOSITION CONTAINING COATED BLEACH PARTICLES

This is a division of application Ser. No. 422,813, filed Dec. 7, 1973, and now U.S. Pat. No. 3,908,045.

BACKGROUND OF THE INVENTION

1. Field of the Invention

The coating or encapsulation of discrete particulate material by a variety of processes is well known. In particular, the art is aware of many variations in processes for coating particulate material by a fluidized bed technique.

The present invention finds utility for applying either a complete single coating or a double coating of a material to a particulate substance.

In the case of a single coating, encapsulation methods known heretofore do not always insure that the particles will have no adverse side effects during use.

The double coating process of the present invention is especially applicable to the coating of particles of highly reactive substances. Most particularly the process finds utility in the detergent bleach field wherein particulate fabric bleaching agents, such as potassium dichloroisocyanurate, sodium dichloroisocyanurate, and the hydrates thereof are employed in home laundering operations as a dry bleach product to be added separately to a washing machine or for use in admixture with particles of a detergent composition to form a commercially acceptable detergent — dry bleach combination. Because of their highly reactive nature the particles must not only be thoroughly and imperviously coated to avoid contact of the bleach particles with the detergent particles, but the coated particles must not attack textile materials or the dyes thereon under washing conditions. Although prior-art processes may provide thorough and uniform coatings impervious to potassium iodide solution, the coated particles of chlorine-releasing compounds suffer the defect that they attack the dye substances at the points of contact with the fabric and have been known to attack the fabric and make pinholes therein in a washing process wherein the coated bleach particles are placed directly on dry clothes.

2. The Prior Art

Art that may be considered in connection with the instant invention is represented by the patents listed below.

U.S. Pat. No. 1,950,956 to Wilhelm

Discloses the coating of chloramine-T with stearic acid.

U.S. Pat. No. 1,480,561 to McNeil

Discloses a process wherein granules are uniformly coated by dropping granules through a spray of a solution of a coating substance and spraying the solution directly upon the granules while they are being agitated in a tumbling mechanism.

U.S. Pat. No. 2,561,392 to Marshall

Relates to process and apparatus for coating moving particles by spraying a solution of a coating material thereon. Provision is made to recirculate the particles to provide a heavier coating. There is also disclosed a means for removing the solvent from the coating material.

U.S. Pat. No. 2,579,944 to Marshall

Discloses a tandem coating system wherein particles in a turbulent state are coated by spraying with a solution of a coating substance in a first chamber and sequentially coated by spraying with a solution of a second substance in a second chamber. The patentee states in column 6, lines 18–22 that it is desirable to have the sprayers adjustable vertically so as to coat the particles properly when the surface of the bed is changed.

U.S. Pat. No. 2,594,469 to Mahoney

Relates to a process wherein particles, such as spray-dried detergent particles fall by gravity within a chamber, and the falling particles are coated by spraying with a solution of the coating substance.

U.S. Pat. No. 2,768,095 to Tadema et al.

Provides a method for uniformly distributing liquids in finely divided solids without substantial loss of materials. The liquid may be a solution of one or more materials in a suitable solvent, and is injected within a fluidized bed of the finely divided solids either counter to, or parallel to, the gas stream used for fluidization.

U.S. Pat. No. 3,650,961 to Hudson

Discloses a method for encapsulating chlorocyanurates with hydratable inorganic salts. A fluidized bed of the inorganic salt is formed, on which is sprayed droplets of a slurry of a chlorocyanurate, or other detergent adjunct. By controlling the droplet size, the detergent is made to form the core material disposed predominantly in the center of the particle, while the inorganic salt, partially hydrated, surrounds the core, and the particle size can be controlled to about 10–100 mesh.

U.S. Pat. No. 3,671,296 to Funakoshi et al.

Particles are coated by treatment with a liquid spray while the particles are circulating in a cyclic pattern. Circulation is accomplished by moving the particles to the outer edge of a rotating circular, horizontal dish, the force of this movement carrying the particles upward along the internal vertical surface of a cylindrical or inwardly curved barrel, then leaving the barrel surface to move toward the center of the barrel, thence falling back to the revolving plate to repeat the circulating process.

SUMMARY OF THE INVENTION

It has now been found that the problem of insuring complete encapsulation of a particulate material without agglomeration may be solved by applying a solution of a coating substance to a fluidized bed of the particulate material, the nozzle from which the coating substance is sprayed being at a critical height from the bed when in a static state.

It has moreover been found that the problem of pinholing, discussed hereinbefore, can be solved or greatly alleviated by applying to the particles of the substance which can cause pinholing, i.e., a substance having at least one reactive chlorine atom in its molecular structure, a first coating of a solidifiable saturated fatty acid, and sequentially applying a second coating of soap by treating the first coating of fatty acid with a solution of a fixed alkali hydroxide selected from the group consisting of sodium hydroxide, potassium hydroxide, and calcium hydroxide.

In a first embodiment, the present invention provides a granular, free-flowing, non-agglomerated, dry chlorinated bleach product for use during the washing of textiles, wherein the granules are coated with a substance which prevents reaction of the bleach product during storage and additionally prevents pinholing of the textiles and attack on the dyestuffs thereon.

It is therefore an object of the invention to apply a double coating to particles of a chlorinated bleach substance.

It is another object of the invention to provide a coating system on particles of a compound having releasable chlorine therein, whereby bleach damage (pinholing) on colored fabrics is prevented and good chlorine release during the wash cycle is provided.

It is a further object of the invention to provide a coating composition for the above-described chlorine-containing bleach compounds which is relatively slow dissolving to prevent bleach damage on colored fabrics and to permit good chlorine release during the wash cycle.

In a second embodiment, the invention provides a process for depositing a complete and continuous single coating on a particulate substance in a fluidized state.

The present invention is described herein in terms of potassium dichloroisocyanurate, a well-known oxidant and household bleach, which has two reactive chlorine atoms per molecule, and readily releases the chlorine in an oxidizing action in contact with a reducible substance, or by hydrolysis in contact with water.

However, the particles which are advantageously coated by the process of the invention are not limited to the aforesaid potassium dichloroisocyanurate, but may be any fluidizable substance in particulate form.

DETAILED DESCRIPTION OF THE INVENTION

In one aspect of the instant invention there is provided a process wherein particles of a chlorine-releasing agent are coated with a double layer of coating substances as described hereinafter.

In another aspect the invention provides a process for applying a single coating substance to any fluidizable particulate material.

The products obtained by the process of the present invention are encapsulated, free-flowing, non-agglomerated particles having a core of the substance to be coated, a first or primary coat of a solidifiable material, which may be the sole coat, and in the case of a core substance which is an oxidant having releasable chlorine in its molecule, the particles have a first coat of a saturated fatty acid and a second coat of a soap of the fatty acid.

A preferred product made by the process of the present invention is encapsulated potassium dichloroisocyanurate in particulate form, said particles having thereon an inner and an outer coating, said inner coating comprising a fatty acid from 12 to 20 carbon atoms, or mixtures thereof, and said outer coating comprising a sodium salt of said acid, or mixtures thereof, said particles of potassium dichloroisocyanurate having said inner coating being completely encapsulated by said sodium salt.

Most preferably, the encapsulated particles suitable for bleaching fabrics in an aqueous medium in accordance with the present invention comprise:

i. a core of potassium dichloroisocyanurate, ii. a primary coating contiguous to said core of a fatty acid comprising about 55% palmitic acid and about 45% stearic acid, and iii. an outer coating of the sodium salt of said fatty acid, said primary coating and said outer coating being substantially continuous.

The core substance may be any substance in particulate form which can be fluidized. Suitable non-chlorinated substances are:
sodium perborate
enzymes
optical brighteners
sodium acetyl salicylate
antibacterial agents
polyethylene glycol/terephthalate copolymers.

Among the chlorine-releasing substances suitable as core material, there may be mentioned those oxidants capable of having their chlorine liberated in the form of free elemental chlorine under conditions normally used for detergent bleaching purposes, such as potassium dichloroisocyanurate, sodium dichloroisocyanurate, chlorinated trisodium phosphate, calcium hypochlorite, lithium hypochlorite, monochloramine, dichloramine, nitrogen trichloride, [(mono-trichloro)-tetra-(mono-potassium dichloro)]penta-isocyanurate, 1,3-dichloro-5,5-dimethyl hydantoin, paratoluene sulfondichloroamide, trichloromelamine, N-chloroammeline, N-chlorosuccinimide, N,N'-dichloroazodicarbonamide, N-chloro acetyl urea, N,N'-dichlorobiuret, chlorinated dicyandiamide, trichlorocyanuric acid, and dichloroglycoluril.

The instant invention is applicable to particulate substances having a wide range of particle sizes, so long as the particles are fluidizable. Commonly, particles of 5 to 120 U.S. mesh size are employed.

When only a single coat is to be deposited by the process described herein the coating substance may be a fatty acid, or may comprise such substances as polyvinyl alcohol, polyvinyl pyrrolidone, polyethylene glycols having a molecular weight from about 6,000 to about 16,000, copolymers of vinyl methyl ether and maleic anhydride, etc. The solvent for the coating substance will be selected with due regard for its volatility and inertness toward the core material. For example, methanol is a suitable solvent for depositing a coating of polyethylene glycol (6000 molecular weight) on particles of sodium perborate. Preferably the boiling point of the solvent is about 90°F to about 180°F. The capacity of the exhaust system will be considered in determining whether a solvent having a boiling point in the upper portion of the foregoing range can be used. For example, if relatively little solvent is required for the coating substance, the boiling point can be higher than in instances wherein a high proportion of solvent is needed.

When a dual coating is to be applied, it is essential that the first coating be a saturated fatty (alkanoic) acid which is solidifiable and which remains solid at temperatures likely to be encountered during manufacture or storage, for example, a temperature of about 85°–130°F. Suitable fatty acids are the well-known n-alkanoic acids having from about 12 to about 20 carbon atoms. A particularly suitable fatty acid is Emersol 132 (trademark of Emery Industries, Inc.), which is substantially 45% stearic acid and 55% palmitic acid and which melts at about 131°–132°F. The fatty acid is applied as a solution in a suitable solvent, methylene chloride being preferred because of its compatibility, non-reactivity with chlorine-releasing agents, non-flammability, and low toxicity.

Moreover, the fatty acid will be selected with due regard to its melting point in relation to the use to which the coated particles are to be put. For example, in the case of a dual-coated product intended for use as a bleaching agent in a home laundering operation, the melting point of the fatty acid may be somewhat higher than the temperature of the wash solution, but not so high that it is not removed from the core by the emulsifying action of the outer soap layer.

The following fatty acids or mixtures thereof are suitable.

|  | Number of Carbon Atoms | Approximate Melting Point, 0°F |
|---|---|---|
| Lauric Acid | 12 | 111 |
| Myristic Acid | 14 | 136 |
| Palmitic Acid | 16 | 147 |
| Stearic Acid | 18 | 157 |
| Arachidic Acid | 20 | 169 |

Specific mixtures of saturated fatty acids suitable for use in the practice of the invention are set forth in the following list.

| Technical Designation | Typical Chain-Length Distribution Percent | | | | | | Approximate Melting Point °F |
|---|---|---|---|---|---|---|---|
|  | $C_{10}$ | $C_{12}$ | $C_{14}$ | $C_{16}$ | $C_{18}$ | $C_{20}$ |  |
| 90% lauric | 4 | 91 | 4 | 1 |  |  | 104 |
| 95% lauric | 1 | 95 | 4 |  |  |  | 109 |
| 99% lauric | 0.3 | 99 | 0.7 |  |  |  | 111 |
| 95% myristic |  | 2 | 95 | 3 |  |  | 127 |
| 90% palmitic |  |  | 1 | 92 | 7 |  | 140 |
| 95% stearic |  |  |  | 0.5 | 97 | 2.5 | 154 |
| Triple-pressed stearic |  |  | 2 | 52 | 46 |  | 131 |
| Palmitic-stearic |  |  | 8 | 75 | 17 |  | 131 |
| Stearic |  |  | 5 | 30 | 65 |  | 139 |

Potassium dichloroisocyanurate, typical of the cyanurates suitable as core substances, is commercially available and may be obtained from the Monsanto Chemical Company. The chemical structure of this compound may be represented by the graphic formula:

Information regarding this and three related compounds may be found in Monsanto Technical Bulletin I-177.

The second coating is a sodium, potassium, or calcium salt of the fatty acid which comprises the first coat.

Figure 1:
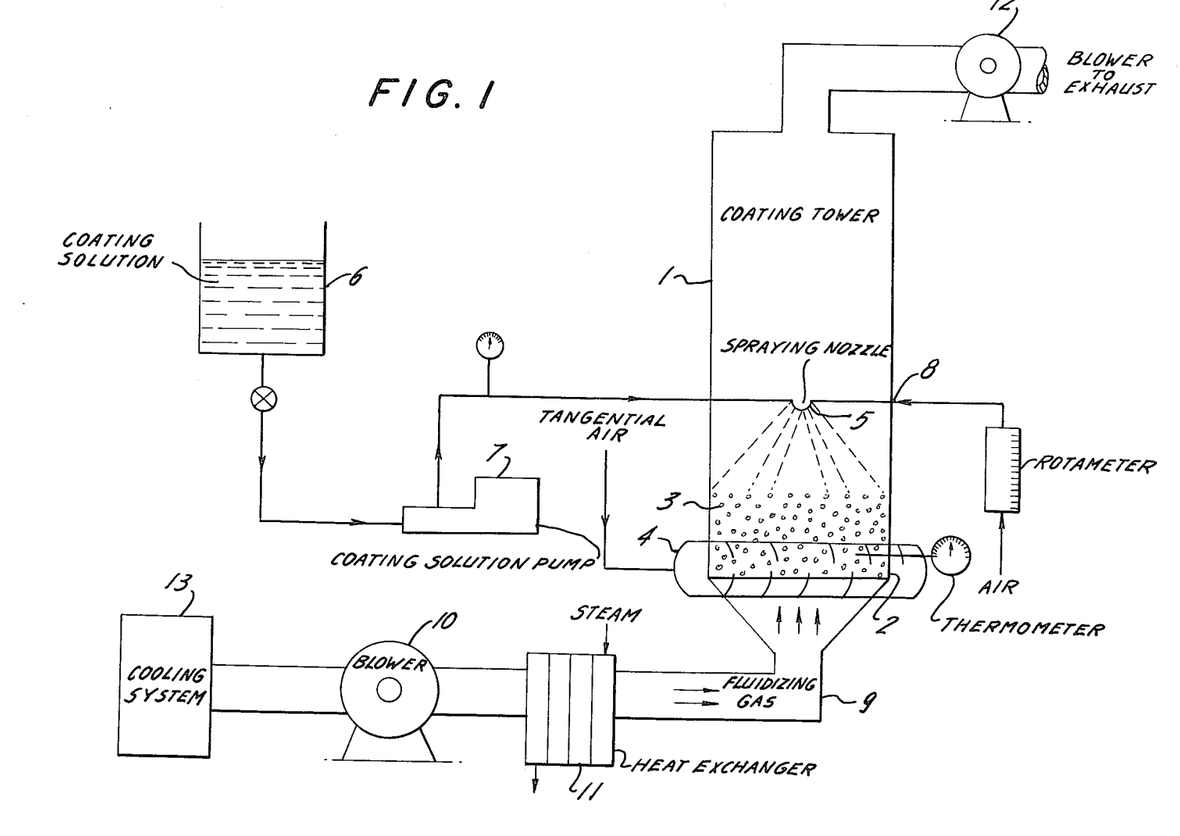
FIG. 1 is a schematic view of the apparatus of the instant invention.
Figure 2:
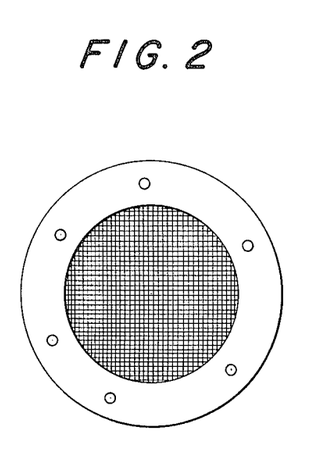
FIG. 2 is a view of the supporting screen located in tower 1 of FIG. 1.
Figure 3:
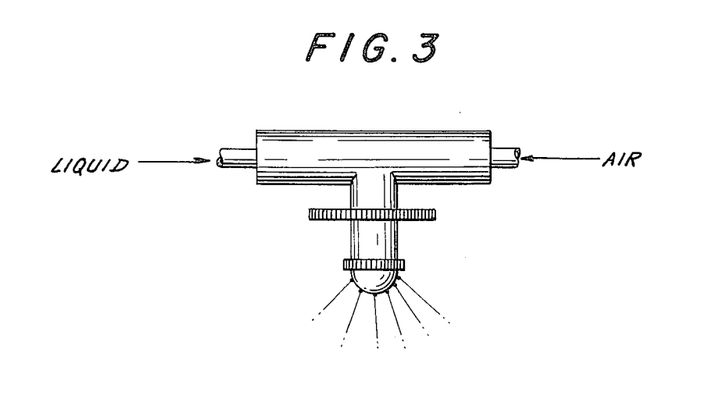
FIG. 3 is a view of the spraying nozzle located at 5 in FIG. 1.

When carrying out the process of the instant invention, the first coating is conveniently applied by means of the apparatus shown schematically in FIGS. 1–3. Referring to the drawings, reference character 1 indicates a chamber or cylindrical tower, wherein the coating or encapsulation of the particles is accomplished. At the base of tower 1 is supporting screen 2 (FIGS. 1 and 2). The tower is fitted with a manifold inlet for the introduction of tangential air shown at 4. Shown at 3 is an unexpanded bed of the particles to be coated. A downwardly projecting nozzle constituting a spraying means 5 is adjustably disposed within the tower 1, and adapted to be adjusted vertically so that the liquid droplets of coating material, discharged in a downwardly diverging three-dimensional pattern, would if sprayed on the bed of particles in the unexpanded state, just cover the upper surface area of the bed, i.e., a right cross section of the spray pattern at the level of the upper surface of the unexpanded bed, is coincident in peripheral configuration therewith.

When the spray nozzle and the spray pattern of droplets issuing therefrom are conical, the nozzle location is such that the projection of the nozzle cone surface intersects the tower wall at the level of the upper surface of the bed of particles when in the unfluidized state.

The coating solution is contained in vessel 6 and is fed to nozzle 5 by pump 7. The spraying of the coating solution from nozzle 5 is aided by pressurized air entering tower 1 at 8. Fluidizing gas passes through duct 9 and is forced through the screen support by blower 10 and is either cooled by cooling system 13, or heated by heat exchanger 11, if required, in order to maintain the fluidizing gas within a critical temperature range. An exhaust blower 12 removes solvent vapors. It will be recognized from the foregoing description that the height of the spray nozzle relative to the bed of particles in the static state is critical to obtain the spray pattern required to deposit a complete and continuous coating on each particle. It has been found that the particles are not adequately coated if there is any substantial deviation in the spray pattern relative to the height of the static bed.

More fully described in terms of a specific embodiment of the apparatus, equipment suitable for carrying out the process of applying the first or sole coating on a particulate substance may comprise a vertical tower 1 having appropriate dimensions, for example, a diameter of about 1 foot and a height of about 5 feet comprising a coating chamber. The bottom of the unit contains a conical shape receptable for entering fluidizing air. The particulate matter is supported by a screen, grid, or porous plate having a sufficient number of openings to provide substantially even distribution of the upward flowing gas over the cross section of the coating tower. All metal parts are fabricated of stainless steel.

It is preferred that the support on which the particle bed rests be substantially a screen, e.g., having about 10 to about 140 U.S. mesh openings per inch, rather than a perforated plate with relatively few openings, to aid the circulation of every particle by the incoming air. Suitably a 60-mesh screen may be used.

Fluidizing air enters the apparatus through a 6 inch diameter flexible duct 9 below the supporting screen. This air is supplied from a conventional air blower capable of delivering air at a superficial air velocity of from about 4–15 feet per second and preferably from about 7–12 feet per second in the fluidizer. Provision has been made either to heat or cool the entering air as required by a steam heat exchanger 11 and a cooling unit 13. In addition, a small amount of air is supplied through a series of nine ¼-inch diameter tubing jets, equally spaced about the inner perimeter at the support screen level. The function of the air jets is to help provide uniform particle coating by preventing any stagnant bed areas from forming at the wall.

Solutions of the coating material are pumped to a two-fluid atomizing nozzle 5 by a simplex reciprocal constant volume metering pump. The nozzle head has at least two, and preferably six, holes so disposed as to spray the coating solution evenly over the entire cross sectional area of the fluidized bed. This particular spray pattern provides a maximum available coating zone. The nozzle can be located at various heights above the support screen depending on the volume of core material in the bed. However, the most suitable location of the nozzle is the point at which the coating solution can be sprayed on the upper perimeter of the unfluidized bed core material.

The coating solution reservoir and pipe lines leading to the nozzle are heated in some cases to prevent solidification of the coating material in solution. Flow meters are used to measure gas flow and this flow is controlled by conventional valves and gauges.

Air is exhausted through a blower 12 to a wash drum. A cyclone separator may be used to recycle the smaller particles that have been elutriated from the bed.

The fluidizer is fitted with two Plexiglas windows and a Plexiglas door that allow for observation during a run. The door also serves as a means of filling and emptying the fluidizer of solid material.

In operation, a known weight of a multiplicity of particles to be coated is placed on the perforated support, or supporting screen 2, in coating tower 1. It is convenient to use a starting batch weight of 10 to 20 pounds of uncoated particles.

Typically the thickness of the layer or bed in the static state is about 1½ to about 6 inches. The height of the spray nozzle 5 is adjusted to a level such that the outermost droplets of the spray therefrom would contact the layer of particles at the perimeter thereof as defined by the layer in static state. Air is caused to flow upwardly by the force created by blower 10 through duct 9, thereby expanding the thickness of the layer of particles, and maintaining the particles in continuous motion within the volume defined by the expanded bed, thus forming a fluidized bed 3.

A solution of a solidifiable coating substance, contained in vessel 6, is sprayed by means of a pump 7 through nozzle 5 on the fluidized bed 3 until all particles in the bed are completely coated. The time required for a coating run in a 1-foot diameter tower may vary from about 10 minutes to about 2 hours, depending upon such factors as type of coating, concentration of coating solution, and the desired rate of application of the coating solution.

It is critical to control the spray pattern as described hereinbefore, and to employ supplemental tangential air so as to insure adequate movement and circulation of all the particles during fluidization and as a result to achieve a complete and continuous coating on all the particles. A suitable spray nozzle is a Sprayco No. 26 nozzle manufactured by the Spraying systems Co. This nozzle contains six holes in the atomizing head.

The fluidizing air velocity is controlled at an optimum for good fluidization. Too low a velocity will result in poor particle circulation and hence a poor coating. Too high a velocity will promote mechanical breakdown of the particles and excessive particle carryover from the body of the bed.

The temperature of the fluidizing air, and hence the temperature of the bed, is controlled within a critical range. Too low a temperature results in too low a rate of solvent evaporation to cause the particles to become too wet, circulate poorly, and agglomerate. Too high a temperature tends to evaporate the solvent prematurely before the coating solution contacts the particle to be coated. Normally the temperature of the fluidizing air is such that the bed temperature is about 80°F to about 130°F.

Particles coated by the above-described procedure are completely encapsulated with a continuous coating, and are free-flowing and non-agglomerated.

It is important that each particle be fully covered, particularly in the case of the bleach compounds having releasable chlorine to be subjected to treatment with a fixed alkali hydroxide, since contact thereof with a chlorinated compound may result in a violent reaction.

When it is desired to apply a second, or outer, coating in accordance with the invention, for example, when the core substance is a chlorine-releasing agent to be used as a bleach in home-laundering operations, the first coating will comprise a saturated fatty acid as described hereinabove.

After removing the fatty acid coated particles from the fluidizer, the particles are treated to apply an outer coating of an alkali metal or alkaline earth soap of the fatty acid which comprises the first coat. The outer coating is advantageously applied by gently agitating the fatty acid coated particles in an aqueous solution of an alkali metal or alkaline earth hydroxide having a concentration as set forth hereinafter, for about 10 minutes to about 2 hours, preferably for about ½ hour, and until the hydroxide reacts with at least a portion of the fatty acid, and completely encapsulates the particles with the reaction product of the fatty acid and the hydroxide.

The temperature of the hydroxide solution is suitably between about 35°F and about 200°F and is not higher than the melting point, and preferably not higher than about 5°F below the melting point, of the particular fatty acid employed for the first coat, and in any event not sufficiently high to melt the fatty acid.

Following the aforementioned treatment the double coated particles are separated from the treating solution for example by decantation on a screen, and dried to produce completely encapsulated, free-flowing, particles coated with a first or inner layer of fatty acid, and a second or outer layer of the fixed alkali soap of the fatty acid.

The proportion of the fatty acid coating that is converted to the corresponding soap is not critical. All that is required is that the encapsulating coat of the reaction product of the fatty acid and fixed alkali hydroxide, i.e., soap, completely cover each particle. The invention contemplates a process wherein some or all of the primary fatty acid coat is converted to soap in the second coating step, provided that the conversion to soap proceeds at least to the extent that the soap covers every particle completely. In a typical case, each particle will have on the surface thereof a first coating of a fatty acid and a second, or outer, coating of the salt of the acid which comprises the first coat.

A critical feature of the second coating is the concentration of the alkali in the solution employed to react with the fatty acid. The concentration of sodium hydroxide should be between about 3% to about 10% by weight when the primary coating is stearic acid or a mixture of stearic and palmitic acids, and should be about 10% to about 15% when the primary coating is lauric acid or the commercial 95% material. The concentration of potassium hydroxide should be between about 10% and about 15%. Calcium hydroxide should be applied as a saturated solution, i.e., about 0.1% by weight. Below the critical concentrations the coating becomes soft and gel-like, and is not protective. At concentrations above the critical levels, this of course not being applicable to calcium hydroxide, the particles tend to rise due to the relatively higher density of the alkali solution and are difficult to coat properly.

Preferred concentrations are about 3% to about 7% sodium hydroxide when the primary fatty acid coating is in the upper portion of the soap-making molecular weight range, for example, palmitic and stearic acids, and about 12% to about 14% sodium hydroxide for the lower portion, for example, when the fatty acid is lauric acid. The preferred concentration of potassium hydroxide is about 10% to about 13%, and of calcium hydroxide, about 0.1%.

The proportion of primary coating substances relative to the single-coated particle may be from about 25% to about 75% by weight, preferably about 50%. The conversion of fatty acid to soap to form the outer coating adds very little to the weight of coating.

The advantages of the dual coating of the present invention (i.e., protection without pinholing) appear to be brought about by a different mechanism by which the bleach particles are made available to the washing solution. When a fatty acid is the only coating, the release of the bleach particle depends upon the melting point of the coating as compared to the temperature of the washing solution. When the melting point of a fatty acid single coating material is the same or lower than the washing temperature, there is severe color damage on colored fabrics (pinholing); when the melting point is higher than the washing temperature no pinholing is discerned but the total available chlorine released from the coated particles is only about 20–60% of the theoretical. In contrast, when particles of potassium dichloroisocyanurate are provided with a dual coating in accordance with the present invention, the bleach particles are released into the washing solution by the relatively slow rate of solubility of the soap coating, to remove as well the undercoating of fatty acid, possibly by an emulsifying action.

In accordance with the foregoing description, the process for coating particles of an oxidizing material having at least one reactive chlorine atom in its molecular structure comprises the steps of:

i. placing said particles in such a configuration as to define a layer thereof having a thickness between about ½ inch and about 6 inches, on a perforated support, ii. adjusting the height of a downwardly disposed spraying means capable of producing a spray of liquid droplets in a downwardly diverging pattern, to a level such that the outermost droplets of said spray contact said layer of particles at the perimeter thereof as defined by said layer in static state, iii. causing a gas to flow upward through said perforated support, thereby expanding the thickness of said layer and maintaining said particles in continuous motion to form a fluidized bed, iv. spraying a solution of a solidifiable fatty acid on said fluidized bed until all particles in said bed are completely coated with said fatty acid, v. treating said coated particles with an aqueous solution of a fixed alkali hydroxide selected from the group consisting of sodium hydroxide, potassium hydroxide, and calcium hydroxide, and mixtures thereof, thereby reacting said hydroxide with at least a portion of said fatty acid, and completely encapsulating said particles with the reaction product of said fatty acid and said hydroxide, the concentration of said fixed alkali hydroxide in said solution being about 3% to about 15% when said fixed alkali is sodium hydroxide, about 10% to about 15% when said fixed alkali is potassium hydroxide, and about 0.1% when said fixed alkali is calcium hydroxide, by weight of said solution.

Encapsulated particles of chlorine-releasing agent prepared in accordance with the instant invention find utility in admixture with particulate detergent compositions having therein an anionic or nonionic detergent species that is not adversely affected by chlorine liberated from the bleaching agent.

The dual-coated particles may be admixed with a particulate detergent composition. Examples of anionic detergents useful in the detergent-bleach compositions of the invention are the higher alkyl mononuclear aromatic alkali-metal sulfonates, such as alkylbenzenesulfonates having about 9 to about 18 carbon atoms in the alkyl group wherein the alkyl group is derived from polypropylene as described by Lewis in U.S. Pat. No. 2,477,382, or wherein the alkyl group is derived from kerosene, as described by Flett in U.S. Pat. No. 2,390,295, and Rubinfeld in U.S. Pat. No. 3,320,174, or wherein the alkyl group is a straight chain and the benzene nucleus is randomly positioned along the alkyl chain, as described in Baumgartner U.S. Pat. Nos. 2,723,240 and 2,712,530, and in U.S. Pat. No. 2,972,583, or wherein the alkyl group is a hexene dimer or trimer as in McEwan U.S. Pat. No. 3,370,100, or wherein the alkyl group is derived from alphaolefins, as in Swenson U.S. Pat. No. 3,214,462.

Also there may be employed primary and secondary alkyl sulfates, i.e., $R-O-SO_3-$ compounds wherein R represents an alkyl group having from 10 to 20 carbon atoms such as sodium, potassium, and magnesium lauryl sulfate, stearyl sulfate, coconut alkyl sulfate and tallow alkyl sulfate; N-long chain acyl-N-alkyl taurates and the salts thereof wherein the long chain is from 8 to 20 carbon atoms such as sodium oleoyl methyl taurate, sodium palmitoyl methyl taurate, sodium lauroyl methyl taurate and the corresponding acyl ethyl taurates; long chain alkyl-oxyethylene sulfates wherein the long chain is from 8 to 20 carbon atoms such as sodium or laurylpolyoxyethylene sulfate, sodium laurylpolyoxyethylene sulfate and sodium cetylpolyoxyethylene sulfate; long chain alkyl aryl oxyethylene sulfates wherein the long chain is from 8 to 20 carbon atoms such as ammonium, sodium or potassium nonyl- octyl- and tridecylphenoxy mono- and polyoxyethylene sulfates; long chain acylisethionates wherein the long chain is from 8 to 20 carbon atoms such as sodium or potassium lauroyl- stearoyl isethionate; alkane- or alkenesulfonates containing 8 to 20 carbon atoms in the alkane or alkene group such as sodium or potassium octane-, decane-, tetradecane-, octadecanesulfonate and octene-, decene-, tetradecene- and octadecenesulfonate; alkoxyhydroxy- alkanesulfonates wherein the long chain is 8 to 22 carbon atoms such as lauryloxyhydroxypropanesulfonate, stearyloxyhydroxyethanesulfonate and tallowoxyhydroxypropanesulfonate; and fatty acid monoglyceride sulfates wherein the long chain is 8 to 22 carbon atoms such as lauric-, myristic-, palmitic and stearic monoglyceride sulfates; alpha-sulfo soap, such as disodium salt of alpha-sulfo fatty acids wherein the fatty acids are derived from tallow, the sulfosuccinates, such as dioctyl sulfosuccinate, sodium salt, the sulfuric acid esters of polyhydric alcohols incompletely esterified with higher fatty acids, such as the sodium salt of sulfated coconut oil monoglyceride, and compounds known as "Medialans", which are amido carboxylic acids formed by condensing fatty acids of $C_8$-$C_{22}$ chain length with sarcosine, $CH_3NH_2CH_2COOH$. Generally the alkali metal salts are employed.

The soaps are included within the definition of anionic detergents as used herein. Operable soaps within the present invention are the sodium and potassium salts of acyclic monocarboxylic acids having chain lengths of about 8 to about 22 carbon atoms. Particularly useful are the salts of unsubstituted fatty acids derived from natural triglycerides, such as tallow, palm oil, cottonseed oil, olive oil, lard, rapeseed oil, etc., and the so-called "high-lauric oils", generally exemplified by the tropical nut oils of the coconut oil class, including in addition to coconut oil, palm kernel oil, babassu oil, ouri curi oil, tucum oil, cohune nut oil, and murumuru oil, and for present purposes, ucuhuba butter, a triglyceride high in myristic acid esters. A particularly useful soap is one prepared from a mixture of about 80% tallow and about 20% coconut oil.

Preferably the detergent composition should be substantially free of compounds containing amino nitrogen to avoid adverse effects during the washing operation.

Other suitable anionic synthetic detergents for use in the present invention can be found in the literature, such as "Surface Active Agents and Detergents" by Schwartz, Perry and Berch published by Interscience Publishers, the disclosures of which are incorporated by reference herein.

The water-soluble polyetheneoxy nonionic organic detergent compounds suitable for use in the practice of the invention may be characterized broadly as ethylene oxide condensates of organic hydrophobic compounds bearing a labile hydrogen atom in a polar substituent, said organic hydrophobic compounds being within a molecular weight range such that when serving as a base for a resulting ethylene oxide condensate, said condensate is capable of having detergent properties at a sufficiently high ethylene oxide content.

Suitable hydrophobic bases falling within the foregoing description are aliphatic alcohols and mixtures thereof having from about 10 to about 15 carbon atoms, corresponding to an average molecular weight of about 158 to about 228. The alcohol is preferably straight-chain but may contain 0% to about 25% lower alkyl branching, mainly methyl, with some 2 – 3 carbon alkyl groups, on the 2-position carbon of the alcohol molecule.

Other suitable hydrophobic compounds include a. the polyoxypropylene diols which form the hydrophobic base of the Pluronics. "Pluronic" is a trademark of the Wyandotte Chemical Corp. The aforementioned hydrophobic base is water-soluble and has a molecular weight from about 1500 to about 1800.

b. Alkylphenols having an alkyl group of about 6 to about 12 carbon atoms. The alkyl group may be straight or branched and may be derived from a propylene polymer, diisobutylene, hexene, nonene, or dodecene, for example, or mixtures of these. The ethylene oxide content of the detergent molecule may range from 52% to about 80% by weight, preferably from about 60% to about 70% by weight.

Among the water-soluble polyetheneoxy organic nonionic detergent compounds useful in the combinations of the instant invention are 1. condensates of ethylene oxide and a primary or secondary alkanol having about 8 to about 16 carbon atoms, the proportion of combined ethylene oxide being from about 52% to about 80% by weight, and mixtures thereof.
2. condensates of ethylene oxide and an alkanol having 14–15 carbon atoms with about 25% 2-methyl branching, the proportion of combined ethylene oxide in said condensate being from about 52% to about 80% by weight, and mixtures thereof.
3. condensates of ethylene oxide and a hydrophobic base selected from the group consisting of the reaction product of propylene oxide and propylene glycol, said reaction product having a molecular weight of about 1800.

The water-soluble polyetheneoxy organic nonionic detergent compounds may include:

1. Poly (ethylene oxide) condensates of primary or secondary aliphatic alcohols having about 11 to about 15 carbon atoms, said condensates having an average of about 9 molar proportions of ethylene oxide per mole of alcohol, and mixtures thereof.
2. Poly (ethylene oxide) condensates of primary aliphatic alcohols having about 12 to about 15 carbon atoms and having about 25% lower alkyl branching on the 2-carbon, said condensates having an average of about 9 to about 20 molar proportions of ethylene oxide per mole of alcohol, and mixtures thereof.
3. A condensate of 1 mole of octylphenol and about 7–8 molar proportions of ethylene oxide.
4. Poly (ethylene oxide) condensates of linear primary alcohols having about 14–15 carbon atoms, and averaging about 13.5 carbon atoms, and having about 25% lower alkyl branching on the 2-carbons, said condensates having an average of about 13.5 molar proportions of ethylene oxide per mole of alcohol.
5. The poly (ethylene oxide) condensates of alkylphenols, e.g., the condensation of products of alkylphenols having an alkyl group containing from about 6 to 12 carbon atoms in either a straight chain or branched chain configuration, with ethylene oxide, said ethylene oxide being present in amounts equal to 6 to 25 moles of ethylene oxide per mole of alkylphenol. The alkyl substituent in such compounds may be derived from polymerized propylene, diisobutylene, octene, dodecene, or nonene, for example.

6. Compounds formed by the simultaneous polymerization of propylene oxide and ethylene oxide, and containing randomly positioned propeneoxy and etheneoxy groups.

As examples of specific nonionic detergent compounds finding utility in accordance with the invention, there may be mentioned:

A. branched-chain nonyl phenol condensed with about 8–14 molar proportions of ethylene oxide,
B. a mixed $C_{11}$-$C_{15}$ secondary alcohol condensed with 9–14 molar proportions of ethylene oxide, the mixed secondary alcohols having the following approximate chain-length distribution:

| | |
|---|---|
| 2% | $C_{10}$ |
| 15% | $C_{11}$ |
| 21% | $C_{12}$ |
| 23% | $C_{13}$ |
| 17% | $C_{14}$ |
| 15% | $C_{15}$ |
| 7% | $C_{16}$, |

C. a mixed $C_{14}$-$C_{15}$ alcohol made by the Oxo process condensed with about 9–15 molar proportions of ethylene oxide, and
D. a mixture of about 65% $C_{14}$ and about 35% $C_{15}$ synthetic straight-chain primary alcohols condensed with about 9–15 molar proportions of ethylene oxide.

The ternary compositions of the present invention may be formulated with a detergent builder as a detergency aid, for example, those mentioned hereinafter, to provide a commercially valuable detergent-bleach composition.

The term "builder" as used herein refers to any substance compatible with, and assisting the detergency of the aforementioned ternary combination.

Suitable builder compounds are tetrasodium and tetrapotassium pyrophosphate, pentasodium and pentapotassium tripolyphosphate, sodium or potassium carbonate, sodium or potassium silicates having an $SiO_2$ : $Na_2O$ ratio of about 1:1 to about 3.2:1, hydrated or anhydrous borax, sodium or potassium sesquicarbonate, phytates, polyphosphonates such as sodium or potassium ethane-1-hydroxy-1, 1-diphosphonate, etc.

Also useful are other organic detergent builders such as the sodium or potassium oxydisuccinates, sodium or potassium oxydiacetates, carboxymethyloxysuccinates, hydrofuran tetracarboxylates, ester-linked carboxylate derivatives of polysaccharides, such as the sodium and potassium starch maleates, cellulose phthalates, semicellulose diglycolates, starch, oxidized heteropolymeric polysaccharides, etc. The weight percent of the builder present in the built anionic detergent composition is from an amount of about 6% and up to about 90% and preferably from about 20% to about 60%. Suitably, a builder may be present in the ratios of about 0.5 to about 10 parts by weight, preferably about 2 to about 5 parts by weight, for each part by weight of the detergent component.

Other materials which may be present in the detergent compositions of the invention are those conventionally employed therein. Typical examples include the well-known soil suspending agents, corrosion inhibitors, dyes, perfumes, fillers, optical brighteners, enzymes, germicides, anti-tarnishing agents, and the like. The balance of the detergent composition may be water.

The detergent compositions with which the encapsulated bleaching agents of the invention find utility may have compositions represented by the following components and ranges of proportions thereof:

| | Approximate Percentage |
|---|---|
| Anionic or nonionic detergent | 1–90% |
| Builder | 0–90% |
| Encapsulated bleaching agent | 2–25% |
| Optical brightener | 0–0.3% |
| Sodium carboxymethylcellulose | 0–1% |
| Water | 5–15% |
| Sodium sulfate | 0–25% |

Detergent compositions formulated for use in the washing of fabrics in automatic washing machines may contain about 5% to about 30% anionic detergent, about 30% to about 60% of one or more of the builders mentioned hereinabove, and sufficient encapsulated bleaching agent to provide 30–200 parts per million chlorine in the wash water, or approximately 2% to 25% of the agent in the detergent formulation. Usually included are about 0.1–0.3% optical brightener, and about 0.4% sodium sulfate, and if desired small proportions of other components such as germicides, anti-caking agents, etc. to confer special properties on the product.

When the detergent is soap, and comprises the major proportion of the detergent-bleach product, the soap may be present in amounts from about 60% to about 90%, little or no builder being required, although about 1% to about 10% of an alkaline builder may be advantageous.

When the detergent is nonionic, from about 5% to about 20% is suitable, the balance of the composition being as listed above.

Detergent compositions formulated for mechanical dishwashers and having the encapsulated bleaching agents of the invention therein may contain low proportions of nonionic detergent, for example about 1% to about 4%, and may contain a suds depressant and a high proportion of a builder, for example about 50%–90% of a mixture of sodium tripolyphosphate, sodium carbonate, and sodium silicate.

The invention may be more fully understood by reference to the following examples.

EXAMPLE 1

This example describes a dual-coating process within the invention.

Thirteen pounds of extra coarse grade potassium dichloroisocyanurate are charged onto the perforated plate of the cylindrical coating tower 1 (FIG. 1). The perforated plate is a 60-mesh stainless steel screen. The particles are fluidized and suspended by an upwardly moving air stream supplied by blower 10. The superficial air velocity of the fluiding air stream is 8.5 feet per second. The temperature of the air is maintained at 95°± 2°F, by heat exchanger 11.

The primary coating solution is prepared by dissolving triple-pressed stearic acid (about 45% stearic acid) in methylene chloride to form a 20% solution. A small amount of ultramarine blue is dissolved in the coating solution for subsequent use in observing the continuity of the primary coating.

The primary coating solution is sprayed on the fluidized particles 3, through nozzle 5, appropriately adjusted as to height. Nozzle 5 has six orifices disposed to provide the desired diverging spray pattern. An auxiliary stream of air is applied to the fluidized bed through 9 nozzles horizontally disposed at the perforated support screen level with the tips of the nozzles placed close to the inner wall of the tower. The air leaves these nozzles in a horizontal path substantially tangential to the wall of the tower. It is the function of this tangential air to assist in keeping in motion the particles at the outer periphery of the plate which do not obtain the full effect of the fluidizing air.

The coating solution is applied to the fluidized particles for a period of 2 hours. The weight of the coating is about equal to the weight of the original particles. The coated particles are of uniform blue color and size, with substantially no agglomeration, and are dry and free-flowing. When some of the coated particles are left immersed for 2 days in an acidified potassium iodide solution, no color change is observed, indicating complete encapsulation of the particles.

The second coating is applied in the following manner.

A 5.2% sodium hydroxide solution is prepared by diluting 60 grams of 50% NaOH solution with 520 grams of distilled water in a two-liter beaker. The dilute solution is heated to 110°F in a water bath and 200 grams of the particles coated as described above are placed in the NaOH solution and gently agitated for 30 minutes, maintaining the temperature of the solution between 105°F and 110°F. The molar ratio of NaOH to fatty acid is 2:1. After the 30-minute treatment, the solution is decanted through a 25-mesh stainless steel screen, and the particles on the screen are dried at room temperature for 24 hours. The particles are free flowing and white, indicating complete covering of the blue-colored first coat.

The single- and double-coated particles are tested for ease of chlorine release and for adverse effect on cloth in the following manner.

Six pounds of white cotton fabric are placed in a top-loading automatic washing machine. Three swatches of blue denim cloth and one swatch of black 65/35 Dacron/cotton cloth, each measuring 12 × 12 inches are placed on top of the cotton cloth in circular configuration. Next, there is placed directly on the fabric 3.4 ounces of a detergent-bleach composition containing 8.0% of the encapsulated material prepared as above. Water at a temperature of 132°F ± 3°F is run directly on the detergent-bleach composition for about 150 seconds to a volume of 17.4 gallons. The wash solution is agitated for 10 minutes, and the fabrics are examined. The results are shown in Table 1.

TABLE 1

| Bleach Composition KDC Coated With | % Available Chlorine | Pinholing (Blue Denim) | % Chlorine Released |
|---|---|---|---|
| Single Coat with Fatty Acid | | | |
| Fatty Acid (A) | 35.0 | 3 | 97–100 |
| Fatty Acid (B) | 37.5 | 0 | 20 |
| Fatty Acid (C) | 39.0 | 1 | 41.5 |
| Dual Coat—First Coat=Fatty Acid (A) | | | |
| 2.85% NaOH 10 min. | 21.03 | 2 | not determined |
| 5.34% NaOH 30 min. | 23.19 | 1 | 69.83 |
| 10.33% NaOH 30 min. | 26.15 | 1 | 87.70 |

(A) about 45% stearic acid and 55% palmitic acid; m.p. 131–132°F
(B) 95% palmitic, 4% stearic, 1% myristic acids; m.p. 138–144°F
(C) about 70% stearic acid and 30% palmitic acid; m.p. 138.5–143°F Pinholing Rating
0 = none (excellent)
1 = minimal pinholing (acceptable)
2 = severe pinholing (unacceptable)
3 = very severe pinholing (unacceptable)

From the foregoing data in Table 1, it may be seen that a single coating of fatty acid is inadequate to accomplish the dual purpose of providing a high chlorine release and at the same time avoid pinholing. It will be noted that fatty acid (A) having a melting point below the temperature of the wash water, melts to release all of the chlorine in the encapsulated material, but causes pinholing, due to contact of the encapsulated material with the fabric upon the melting of the fatty acid coating. Fatty acids (B) and (C), having melting points above the temperature of the wash water, are unsatisfactory, since they do not allow a sufficient relase of chlorine to be of any value as a bleach, although the low level of chlorine release prevents pinholing.

Again referring to the foregoing data, it will be observed that a dual coating applied in accordance with the invention prevents pinholing to a substantial extent, and additionally allows an adequate release of chlorine.

EXAMPLE 2

This example further illustrates the present process for applying a first coat of fatty acid to particles of potassium dichloroiosycanurate.

A coating solution is prepared in vessel 6 by dissolving 10 pounds of fatty acid (about 70% stearic acid and 30% palmitic acid) in 40 pounds of methylene chloride. Twenty grams of blue pigment is added and the solution warmed at 95°F.

Ten pounds of extra coarse grade potassium dichloroisocyanurate is screened to 25 mesh and placed on the 40-mesh supporting screen in coating tower 1 (FIG. 1). Fluidizing air is forced into the apparatus through duct 9 at a superficial air velocity of 6.8 feet per second. Tangential air is supplied as needed. The temperature of the bed is maintained at 107°± 2°F.

The coating solution is sprayed downward onto the fluidized bed through a 6-hole atomizing nozzle located 12 inches above the supporting screen. The coating is applied at the rate of 6.7 pounds per hour, and the solvent is evaporated at the rate of 23 pounds per hour.

The coated product is a dry, nonagglomerated, free-flowing particulate solid of which the particles are substantially uniform in size. A test in potassium iodide solution indicates that the particles are completely covered.

After storing for 8 weeks at 80°F and 80% relative humidity admixed with particles of a commercial detergent, substantially no loss of chlorine occurs. A control wherein the potassium dichloroisocyanurate is uncoated loses 90% of its chlorine.

EXAMPLE 3

This example illustrates the coating of sodium perborate with polyethylene glycol, m.w. 6,000.

The process follows that described in Example 1, except that 10 pounds of coarse grade sodium perborate is used as the core material, and the coating material is polyethylene glycol, m.w. 6,000 applied from a 20% solution in methanol. A small amount of Congo Red dye is dissolved in the methanol for subsequent use in judging the continuity of the coating. The weight ratio of coating to core material is 1:2, that is, the coated particles have ⅓ coating material by weight. This requires 25 pounds of coating solution, or 20 pounds of solvent, i.e., methanol, to be evaporated. The evaporation is accomplished in 2 hours at a bed temperature of 80°–90°F, and a final fluidizing air velocity of 6.8 feet per second. The bed of perborate particles is 2 inches thick before fluidizing. The coating solution is applied from a nozzle located 1 foot from the top of the 2-inch thick bed.

EXAMPLE 4

The process of this example is the same as that of Example 3, except that the coating material is polyvinyl-pyrrolidone having a molecular weight of 15,000, and the air velocity of the fluidizing air is 4.3 feet per second.

EXAMPLE 5

A spray-dried detergent composition having the following formula is prepared by conventional procedures.

| | |
|---|---|
| % Alkylbenzenesulfonate | 10.0 |
| % Sodium tripolyphosphate | 33.0 |
| % Sodium silicate solids (SiO$_2$:Na$_2$O = 2.4) | 6.0 |
| % Optical brightener | 0.1 |
| % Carboxymethylcellulose | 0.3 |
| % Water | 10.0 |
| % Sodium sulfate and miscellaneous matter introduced with the components | 40.0 |
| | 100.0 |

To separate portions of the above-described compositions are mixed various proportions of the dual-encapsulated product of Example 1, the proportions being as follows.

| | Parts By Weight | | | | |
|---|---|---|---|---|---|
| Example No. | 5A | 5B | 5C | 5D | 5E |
| Spray-dried composition | 80 | 84 | 88 | 92 | 96 |
| Product of Example 1 | 20 | 16 | 12 | 8 | 4 |

EXAMPLE 6

A composition suitable for use in mechanical dishwashers and having the following formula is prepared by conventional

| | |
|---|---|
| % Nonionic detergent[a] | 2.0 |
| % Sodium tripolyphosphate | 20.0 |
| % Trisodium orthophosphate | 25.0 |
| % Sodium metasilicate | 13.0 |
| % Water | 10.0 |
| % Encapsulated bleaching agent | 30.0 |
| | 100.0 |

[a] A condensate of a mixture of primary aliphatic alcohols having about 12–15 carbon atoms with about 25% lower alkyl branching on the 2-carbon, and about 9 molar proportions of ethylene oxide.

EXAMPLE 7

This experiment shows the effect of coating temperature on the second coat of potassium dichloroisocyanurate when the second coating solution is a solution of potassium hydroxide. The first coat is applied as in Example 1. The second coat is applied under a variety of conditions, namely at several concentrations and at temperatures of 85°F and 100°F. The results of these tests show that a satisfactory dual coating is obtained when the second coating is applied from a 10% solution of KOH at a temperature of 85°F. However, at a temperature of 110°F, the second coating becomes gel-like when the KOH concentration is less than 10%, and cracks upon drying when the KOH concentration is 15%–20%.

EXAMPLE 8

This example illustrates the effect of sodium hydroxide concentration of from 3% to 10% in the solution employed for applying the second coat to particles of potassium dichloroisocyanurate.

In this experiment the fatty-acid-coated particles are treated with the alkali solution at a temperature of 110°F and a reaction time of 30 minutes, other test conditions being as described in Example 1. The weight of total coating is approximately the same as the weight of starting core substance.

Eight parts by weight of the double coated potassium dichloroisocyanurate are admixed with 92 parts by weight of a spray-dried detergent composition having the formula set forth in Example 5. The mixture is tested in a washing machine at a wash-water temperature of 135°F and a 12-minute agitation, other conditions being as described in Example 1. During the washing period, the wash solution is analyzed for oxidizing chlorine, and from this figure is calculated the percentage of available chlorine in the mixture that is released. Samples are taken and analyzed ½, 2, 5, 8, 10 and 12 minutes after the start of the agitation of the wash solution. At the end of the test, the denim swatches are visually observed for pinholing. The results are provided in Table II, below. It will be noted that the concentration of the sodium hydroxide in the solution used to apply the second coat to the particles has no effect on the percentage of chlorine released during use. Pinholing is virutally absent when the second coat is applied from a 3%–7% sodium hydroxide solution, and is greatly reduced when the concentration is 8%–10%.

TABLE II

PINHOLE TEST AND AVAILABLE CHLORINE RELEASE

| Example | Concentration of NaOH Used to Apply Second Coat | Available Chlorine (%) | "Pinholing"[1] Rate | 30 sec. | 2 min. | % Chlorine Released 5 | 8 | 10 | 12 min. |
|---|---|---|---|---|---|---|---|---|---|
| 7a | 3% NaOH | 26.14 | 0–1 | 16.88 | 52.17 | 80.26 | 89.13 | 89.12 | 89 |
| 7b | 4% | 24.79 | 0–1 | 0 | 43.22 | 50.49 | 76.47 | 90.44 | 89.57 |
| 7c | 5% | 24.50 | 0–1 | 4.38 | 43.35 | 89.04 | 89.04 | 95.6 | 92.51 |
| 7d | 6% | 26.10 | 0–1 | 0 | 39.73 | 56.86 | 77.41 | 89.32 | 90.27 |
| 7e | 7% | 27.95 | 0–1 | 5.58 | 56.58 | 86.32 | 90.50 | 91.05 | 93.23 |
| 7f | 8% | 28.32 | 1–2 | 19.23 | 49.24 | 78.07 | 93.26 | 93.54 | 90.36 |
| 7g | 9% | 30.29 | 1–2 | 20.43 | 75.08 | 90.69 | 87.31 | 93.10 | 87.81 |
| 7h | 10% | 27.92 | 1–2 | 14.17 | 63.50 | 92.23 | 89.41 | 94.95 | 90.0 |

Notes:
[1]"Pinholing Rate"
0 = No pinholing (excellent)
1 = Pinholing observed (acceptable)
2 = Severe pinholing

EXAMPLE 9

This example illustrates the substantially complete stability of potassium dichloroisocyanurate having a double coating in accordance with the present invention.

To separate portions of the spray-dried detergent composition having the formula of Example 5 are added double coated particles of potassium dichloroisocyanurate prepared by the process of Example 1, the coated particles added to one portion having had the second coat applied from a 5% NaOH solution, and the coated particles added to the other portion having had the second coat applied from a 10% NaOH solution. The proportion of the double coated potassium dichloroisocyanurate relative to the proportion of detergent composition is such as to provide about 2% available chlorine, basis total mixture. A control mixture is prepared wherein uncoated potassium dichloroisocyanurate is mixed with the detergent composition of Example 5 in a proportion to provide approximately 2% available chlorine.

Six cartons of each of the three aforesaid mixtures are prepared, each carton containing 400 grams of the total mixture. The base detergent composition and the bleach component are separately added to each carton to avoid sampling and segregation errors which might be possible if the cartons were filled from a larger bulk mixture. The contents of each carton are blended in a rotating mixer. The cartons are wax laminated to provide a vapor barrier.

Each sample is stored in the aforementioned cartons in sealed condition at a temperature of 80°F and 80% relative humidity. Prior to sealing, two weighed samples are removed from two cartons of each of the three mixtures and analyzed for available chlorine content. The analysis shows that the available chlorine content prior to storage ranges from 1.95% to 2.16%, with a mean value of 2.04%, basis mixture of detergent composition and dichloroisocyanurate. The stored mixtures are sampled and analyzed for available chlorine content after 1, 2, 4, 6, 8 and 12 weeks, one carton of each mixture being removed from storage for a duplicate analysis at each of these periods. The results, presented in Table III, show that the uncoated potassium dichloroisocyanurate loses about 15% of its available chlorine under the aforementioned storage conditions while the double coated dichloroisocyanurate loses only about 2% to about 2.5% of its available chlorine. The protection afforded by the second coating whether applied from a 5% NaOH solution or a 10% NaOH solution is substantially the same.

TABLE III

AVERAGE AVAILABLE CHLORINE AND % AV. CHLORINE LOSS

| Bleach Component | % Av. Chlorine and Its Loss | 0 Wk. | 1 Wk. | 2 Wk. | Storage Time 4 Wk. | 6 Wk. | 8 Wk. | 12 Wk. |
|---|---|---|---|---|---|---|---|---|
| Uncoated | % Av. Chlorine | 2.04 | 1.83 | 1.83 | 1.81 | 1.78 | 1.69 | 1.74 |
|  | % Loss | 0.00 | 10.29 | 10.29 | 11.27 | 12.75 | 17.16 | 14.71 |
| Coated[a] | % Av. Chlorine | 2.04 | 2.16 | 1.99 | 1.94 | 2.10 | 1.98 | 2.00 |
|  | % Loss | 0.00 | −3.43 | 2.45 | 4.90 | −2.94 | 2.94 | 1.96 |
| Coated[b] | % Av. Chlorine | 2.04 | 1.97 | 1.94 | 1.93 | 2.11 | 2.03 | 1.99 |
|  | % Loss | 0.00 | 3.43 | 4.90 | 5.39 | −3.43 | 0.49 | 2.45 |

[a]Second coating applied from a 5% solution of NaOH
[b]Second coating applied from a 10% solution of NaOH

EXAMPLE 10

This example shows the effect on stability of coated and uncoated chlorinated cyanurates admixed with a detergent composition when stored variously in open wax-laminated barrier cartons and in open and closed non-barrier cartons, i.e., allowing free or only partially restricted passage of vapors.

Mixtures are prepared, stored and analyzed as described in Example 8, with the exception that the second coating, when applied, is applied from a 6% NaOH solution, and other exceptions identified as follows:

| Ex. | Core | Coating | Carton |
|---|---|---|---|
| 9a | Potassium dichloroisocyanurate | Double | Barrier type Open top |
| 9b | " | " | Non-barrier type Open top |
| 9c | " | " | Non-barrier type Closed top |
| 9d | Potassium dichloroisocyanurate dihydrate | Not Coated | Non-barrier type Open top |

| Ex. | Core | Coating | Carton |
|---|---|---|---|
| 9e | Potassium dichloroisocyanurate | Not Coated | Barrier type Open top |
| 9f | '' | Not Coated | Non-barrier type Open top |
| 9g | '' | Not Coated | Non-barrier type Closed top |

After 2 weeks' storage at 80°F and 80% relative humidity, the chlorine losses are determined. The protective action of the double coating as compared with uncoated particles of chlorine bleaching agent is evident from the data set forth below:

| Example | | Storage Time | |
|---|---|---|---|
| | | 0 Week | 2 Weeks |
| 9a | % Chlorine | 2.31 | 2.26 |
| | % Loss | — | 2.1 |
| 9b | % Chlorine | 2.28 | 2.21 |
| | % Loss | — | 3.1 |
| 9c | % Chlorine | 2.29 | 2.28 |
| | % Loss | — | 0.4 |
| 9d | % Chlorine | 2.09 | 0.96 |
| | % Loss | — | 54.1 |
| 9e | % Chlorine | 2.01 | 1.99 |
| | % Loss | — | 1.5 |
| 9f | % Chlorine | 2.08 | 1.75 |
| | % Loss | — | 15.9 |
| 9g | % Chlorine | 1.99 | 1.86 |
| | % Loss | — | 6.5 |

Having described the invention, modifications within the purview thereof will occur to those skilled in the art, and accordingly the invention is to be limited only within the scope of the appended claims.

What is claimed is:

1. A bleaching detergent composition comprising an anionic detergent admixed with encapsulated potassium dichloroisocyanurate in particulate form, said particles having thereon an inner and an outer coating, said inner coating comprising a fatty acid from 12 to 20 carbon atoms, or mixtures thereof, and said outer coating comprising a sodium salt of said acid, or mixtures thereof, said particles of potassium dichloroisocyanurate having said inner coating being completely encapsulated by said sodium salt, said detergent being in particulate form, and said detergent being free from amino nitrogen in its molecular structure.

* * * * *